United States Patent Office 2,717,910
Patented Sept. 13, 1955

2,717,910

ALCOHOL SYNTHESIS

Michael Erchak, Jr., Morris Plains, N. J., assignor to Allied Chemical & Dye Corporation, New York, N. Y., a corporation of New York No Drawing. Application January 25, 1949, Serial No. 72,760

1 Claim. (Cl. 260—642)

This invention relates to the production of alcoholic products in the liquid to low melting solid range, more particularly to production of alcoholic products containing 5–30 carbon atoms in the molecule.

An object of the invention is to produce said alcoholic products by a simple process from readily available starting materials, namely, a low molecular weight alcoholic compound containing 1–8 carbon atoms in the molecule and ethylene. Another object is to produce normal primary alcohols containing 5–30 carbon atoms per molecule. Other objects and advantages will appear hereinafter.

It has been proposed in the past to polymerize ethylene in the presence of a low molecular weight alcohol and an ethylene polymerization catalyst to form solid products of varying hardness having an average carbon content per molecule of about 100–300. The carbon contents of the individual molecules making up these prior products vary widely. Prior methods for obtaining alcohols of 5–30 carbon atoms, particularly for normal primary alcohols in this range, are rather complicated and expensive.

So far as I am aware, I am the first to discover that polymerization conditions exist under which the degree of polymerization of ethylene in presence of a low molecular weight alcoholic compound can be very much limited, so that although polymerization chains begin, almost all, when no more than 10 to 15 ethylene molecules have combined, are stopped by addition thereto of constituent radicals of the low molecular weight alcoholic compound which is present, thereby producing an alcohol containing 5–30 carbon atoms.

Alcoholic products of my process are valuable for many purposes, for example in producing esters, e. g. organic and inorganic ester plasticizers, and for various other uses.

In accordance with my invention ethylene and a low molecular weight alcoholic compound having 1–8 carbon atoms in the molecule are heated together under elevated pressures in presence of oxygen catalyst, and at temperatures between 50° C. and 200° C. above the temperatures, characteristic for said catalyst, at which reaction in presence of the catalyst shows a sharp increase in rate, which characteristic temperatures are hereinafter called initial reaction temperatures of the catalyst. The initial reaction temperature of a catalyst under any given set of conditions may readily be ascertained by heating the reaction mixture containing the catalyst under the proposed conditions to progressively higher temperatures and observing the temperature at which pressure suddenly increases, denoting the start of rapid reaction. The temperatures so observed are the temperatures designated herein as initial reaction temperatures of the catalyst.

Ethylene pressure, mol ratio of alcoholic compound: ethylene, and concentration of the catalyst are factors which have important influence on the space-time yields of reaction products and on the average chain lengths and chain length distributions in my reaction products; a factor which is critical in obtaining satisfactory yields of alcoholic products of carbon content within the range $C_5$–$C_{30}$ from ethylene and an alcoholic compound in presence of an ethylene polymerization catalyst is use of a reaction temperature at least 50° C. above the initial reaction temperature of the catalyst, but not more than about 200° C. above said initial reaction temperature. Increasing temperatures have a general tendency to lower the average chain lengths of the products, but only a limited range of temperatures is operative for my purpose. At temperatures above the specified range decomposition of reaction products may be severe, and with some catalysts it has been observed that when temperatures are too high (even though still below the temperatures at which the desired products are decomposed) none of the desired product is obtained.

In general, any alcoholic compound having between 1 and 8 carbon atoms in the molecule may be employed in my process. For example, I have successfully employed, among others, methanol, ethanol, the propanols, the butanols, n-amyl alcohol, n-octyl alcohol, cyclohexanol, allyl alcohol, and ethanolamine. When methanol is employed, the products are normal, primary saturated alcohols. These alcohols, the secondary alcohols obtained when ethanol is the alcoholic reactant, and the tertiary alcohols obtained when isopropanol is the alcoholic reactant are products of preferred embodiments of my process.

The following example is illustrative of my invention but is not intended to limit the scope of the invention.

In the example an 1820 cc. stainless steel autoclave provided with a rocker, a controlling thermocouple, and a hydraulic pressure gauge was charged under an inert or ethylene atmosphere with the specified quantity of low molecular weight alcoholic compound. After the autoclave reached the desired reaction temperature the desired pressure was established by addition of ethylene. Pressure was maintained during the reaction period by intermittent additions of ethylene.

At the end of the reaction period the autoclave was cooled and the products were removed for identification and analysis.

*Example.*—600 cc. of methanol were introduced into the autoclave as described above, agitation was started, the autoclave was heated to 340° C. and compressed commercial ethylene containing about 0.1% by weight of oxygen was introduced into the autoclave until the total pressure was about 7000 pounds per square inch. Temperatures of about 340° C. and pressures of about 7000 p. s. i. were maintained for six hours; the autoclave was then cooled and excess ethylene was allowed to escape.

The products were distilled to separate unreacted methanol, and were then fractionated, first at atmospheric and then at reduced pressures. Fractions were separated boiling up to 120° C. at 1 mm. mercury pressure, corresponding to alcohols of carbon content less than 11 carbon atoms per molecule; 120–220° C. at 1 mm. ($C_{11}$–$C_{21}$ alcohols) and residue.

The total yield of reaction products thus obtained was 264 grams. The products were largely alcoholic. About 25–35 weight percent of the products contain 5–11 carbon atoms per molecule, 35–40 weight percent contain 11–21 carbon atoms per molecule and about 25 weight percent contain more than 21 carbon atoms per molecule.

Under the same conditions as described above, except that the reaction temperature was about 310° C., the total yield of reaction products was 160 grams of which 15–20 weight percent was $C_5$–$C_{11}$ alcohols, 40–45 weight percent was $C_{11}$–$C_{21}$ alcohols and 35–40 weight percent was alcoholic product of carbon content above $C_{21}$.

The initial reaction temperature of oxygen catalyst under the conditions of the above example is about 275° C.

In addition to the particular choice of alcoholic compound, catalyst and temperature, factors which influence the space-time yields of products of my process and the chain length distributions are concentration of catalyst and mol ratio of alcoholic compound:ethylene. The curve of space-time yield plotted against each of these variables passes through a broad maximum, and the average chain length of the products drops slowly toward a limiting value as each of these variables increases.

Pressure also exerts an influence on space-time yield and chain length. Space-time yields increase with increasing ethylene pressures but ethylene pressure increase tends to produce increasing average chain lengths. This tendency may be countered by increasing the operating temperature, the catalyst concentration, and/or the alcoholic compound:ethylene mol ratio; these latter changes may, however, result in reduction of space-time yields.

Suitable operating conditions for my process employing, for example, a saturated monohydric alcohol as the alcoholic compound (at temperatures between 50° C. and 200° C. above the initial reaction temperature of the catalyst) include alcoholic compound:ethylene mol ratios usually above about 1, preferably between about 2:1 and 10:1, and amounts of input catalyst which may be less but are usually more than about 0.1 part by weight, preferably about 0.2–0.5 part by weight per 100 parts of input alcoholic compound. Total pressures in my process are usually above about 1000 p. s. i. but not above about 7500 p. s. i., and preferably between about 3500 p. s. i. and 7000 p. s. i.

Preferred temperatures for use with oxygen are between about 300° and 350° C. The saturated monohydric alcohols containing 1–4 carbon atoms in the molecule are preferred low molecular weight alcoholic compounds since these compounds react to give high yields of valuable products. My application entitled "Alcohol Process," Serial No. 72,759, filed January 25, 1949, claims my preferred process involving use of hydrogen peroxide catalyst.

As indicated above, the particular choice of operating conditions to produce optimum results depends on the catalyst conditions and alcoholic compound employed; and the conditions of temperature, pressure, mol ratio of alcoholic compound:ethylene, and concentration of catalyst should be coordinated according to the principles set out above, usually within the ranges noted above as suitable, to obtain optimum results.

With oxygen catalyst and a saturated $C_1$–$C_4$ monohydric alcohol, optimum conditions comprise temperatures between about 310° C. and about 340° C., pressures about 7000 p. s. i., mol ratios of alcohol:ethylene about 1:1–2:1, and amounts of oxygen not more than about 0.1 part by weight per 100 parts of ethylene introduced into the reaction zone.

Although the operations in the example are conducted batchwise, my process may be carried out continuously if desired.

As indicated in connection with the example, the products of my process may be fractionated to produce various cuts, broad or narrow. The cuts of lower molecular weight are liquids at normal temperatures, and the cuts beginning with about the $C_{15}$ cut are soft, smooth, white or light colored solids of faint pleasant odor consisting principally of alcohols and usually containing lesser amounts of hydrocarbon and/or compounds containing an alkoxy group.

I claim:

A process of reacting ethylene and a saturated monohydric alcohol containing 1–8 carbon atoms in the molecule in presence of oxygen catalyst to form liquid alcohol products containing 5–30 carbon atoms in the molecule, which process comprises heating together under total pressure above about 1000 p. s. i. ethylene and said alcohol in mol ratio of alcohol:ethylene at least about 1 together with said oxygen catalyst in input amount not more than about 0.1 part by weight per 100 parts of input ethylene at temperatures between about 300° C. and about 350° C.

References Cited in the file of this patent

UNITED STATES PATENTS

| Number | Name | Date |
|---|---|---|
| 2,402,137 | Hanford et al. | June 18, 1946 |
| 2,409,683 | Howk et al. | Oct. 22, 1946 |
| 2,411,158 | Hanford | Nov. 19, 1946 |
| 2,432,287 | Cramer | Dec. 9, 1947 |
| 2,440,801 | Hanford et al. | May 4, 1948 |
| 2,495,286 | Brubaker | Jan. 24, 1950 |